US010309137B2

(12) United States Patent
Wu et al.

(10) Patent No.: US 10,309,137 B2
(45) Date of Patent: Jun. 4, 2019

(54) HINGE STRUCTURE

(71) Applicant: Acer Incorporated, New Taipei (TW)

(72) Inventors: Chun-Hsien Wu, New Taipei (TW);
Yan-Lin Kuo, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/832,777

(22) Filed: Dec. 6, 2017

(65) Prior Publication Data
US 2018/0335809 A1 Nov. 22, 2018

(30) Foreign Application Priority Data

May 18, 2017 (TW) .............................. 106116528 A

(51) Int. Cl.
*E05D 3/18* (2006.01)
*G06F 1/16* (2006.01)
(Continued)

(52) U.S. Cl.
CPC ................ *E05D 3/18* (2013.01); *E05D 11/10* (2013.01); *E05D 11/1028* (2013.01); *F16C 11/04* (2013.01); *G06F 1/1681* (2013.01); *E05Y 2201/224* (2013.01); *E05Y 2201/414* (2013.01); *E05Y 2201/48* (2013.01); *E05Y 2201/492* (2013.01); *E05Y 2900/606* (2013.01); *F16M 13/005* (2013.01); *G06F 1/1626* (2013.01)

(58) Field of Classification Search
CPC ..... E05D 1/04; E05D 2001/045; E05D 11/10; E05D 11/1028; E05D 11/1042; E05D 11/105; E05D 11/1064; E05D 2011/035; E05D 3/18; Y10T 16/54035; Y10T 16/54038; Y10T 16/5404; Y10T 16/54044; Y10T 16/54048; G06F 1/1681; G06F 1/1626

See application file for complete search history.

(56) References Cited

U.S. PATENT DOCUMENTS

| 93,402 A | * | 8/1869 | Blake | ........................ E05D 1/04 16/355 |
| 375,394 A | * | 12/1887 | Strachan | .................. E05D 1/04 16/355 |

(Continued)

FOREIGN PATENT DOCUMENTS

CN 102817904 12/2012
TW I549594 9/2016

*Primary Examiner* — Jeffrey O'Brien
(74) *Attorney, Agent, or Firm* — JCIPRNET

(57) ABSTRACT

A hinge structure is adapted to connect two objects for the two objects rotating with respect to each other. The hinge structure includes a first member, a second member, a third member, and an elastic assembly. The first and the third members are respectively assembled to the two objects. The second member pivoted to the first member rotates about an axis relative to the first member. The third member pivoted to the second member rotates about the axis relative to the second member. In a first state, the second member is accommodated in a recess of the first member. In a second state, the second member moves with the third member and at least a portion of the second member is moved out of the recess. The elastic assembly connected between the first and the third members constantly moves the second member into the recess to maintain the first state.

11 Claims, 5 Drawing Sheets

(51) Int. Cl.
   *F16C 11/04* (2006.01)
   *E05D 11/10* (2006.01)
   *F16M 13/00* (2006.01)

(56) References Cited

U.S. PATENT DOCUMENTS

| | | | | |
|---|---|---|---|---|
| 457,824 A * | 8/1891 | Curtis | | E05D 1/04 16/355 |
| 724,962 A * | 4/1903 | Soss | | E05D 1/04 16/355 |
| 1,269,764 A * | 6/1918 | Weaver | | E05D 11/1042 16/334 |
| 2,056,805 A * | 10/1936 | Reichard | | E05D 1/04 16/355 |
| 2,770,834 A * | 11/1956 | Saverio | | E05D 1/04 16/250 |
| 3,262,149 A * | 7/1966 | Gorton | | E05D 11/1014 16/278 |
| 4,114,236 A * | 9/1978 | Vandervort | | E05D 11/105 16/335 |
| 5,107,401 A * | 4/1992 | Youn | | G06F 1/1616 16/357 |
| 5,406,678 A * | 4/1995 | Kaden | | G06F 1/1616 16/342 |
| 5,946,774 A * | 9/1999 | Ramsey | | E05D 1/04 16/355 |
| 6,292,981 B1 * | 9/2001 | Ford | | E05D 1/04 16/357 |
| 7,192,105 B2 * | 3/2007 | Jung | | E05D 11/1064 312/405 |
| 7,306,075 B2 * | 12/2007 | Winslow | | E06C 1/18 16/357 |
| 8,118,274 B2 * | 2/2012 | McClure | | F16M 11/125 248/455 |
| 8,243,432 B2 * | 8/2012 | Duan | | H05K 5/0234 248/188.8 |
| 8,248,791 B2 * | 8/2012 | Wang | | F16M 11/10 248/188.8 |
| 8,267,368 B2 * | 9/2012 | Torii | | F16M 11/10 248/188.8 |
| 8,403,288 B2 * | 3/2013 | Cheng | | F16M 11/10 248/673 |
| 9,134,808 B2 * | 9/2015 | Siddiqui | | G06F 1/1618 |
| 9,304,549 B2 * | 4/2016 | Siddiqui | | E05D 7/00 |
| 9,317,072 B2 * | 4/2016 | Park | | G06F 1/1615 |
| 9,382,736 B2 * | 7/2016 | Tejima | | E05D 1/04 |
| 9,404,298 B1 * | 8/2016 | Chen | | G06F 1/1681 |
| 9,447,620 B2 * | 9/2016 | Park | | E05D 11/10 |
| 9,512,655 B2 * | 12/2016 | Kuo | | E05D 1/04 |
| 9,549,479 B2 * | 1/2017 | Gault | | H05K 5/0226 |
| 9,752,361 B2 * | 9/2017 | Park | | E05D 11/082 |
| 9,759,242 B2 * | 9/2017 | Hsu | | G06F 1/16 |
| 9,766,663 B2 * | 9/2017 | Siddiqui | | G06F 1/1618 |
| 9,822,567 B1 * | 11/2017 | Lin | | E05D 11/06 |
| 9,864,415 B2 * | 1/2018 | Siddiqui | | E05D 1/04 |
| 9,904,327 B2 * | 2/2018 | Whitt, III | | G06F 1/1618 |
| 9,964,998 B2 * | 5/2018 | Park | | E05D 11/10 |
| 10,037,057 B2 * | 7/2018 | Schafer | | G06F 1/1681 |
| 10,066,429 B2 * | 9/2018 | Park | | E05D 1/04 |
| 2006/0090298 A1 * | 5/2006 | Kitamura | | F16F 1/32 16/337 |
| 2006/0123595 A1 * | 6/2006 | Duan | | H04M 1/0216 16/337 |
| 2006/0272128 A1 * | 12/2006 | Rude | | E05D 11/084 16/342 |
| 2007/0164191 A1 * | 7/2007 | Kim | | F16C 11/10 248/686 |
| 2008/0256748 A1 * | 10/2008 | Saito | | F16M 11/10 16/321 |
| 2010/0037431 A1 * | 2/2010 | Chiang | | G06F 1/1616 16/342 |
| 2010/0133414 A1 * | 6/2010 | Lee | | H04M 1/0297 248/686 |
| 2010/0142130 A1 * | 6/2010 | Wang | | H04M 1/04 361/679.01 |
| 2010/0259876 A1 * | 10/2010 | Kim | | F16M 11/10 361/679.01 |
| 2010/0282923 A1 * | 11/2010 | Wang | | F16M 11/10 248/158 |
| 2011/0025176 A1 * | 2/2011 | McClure | | A47B 23/042 312/223.2 |
| 2011/0197392 A1 * | 8/2011 | Yamaoka | | E05D 11/1014 16/82 |
| 2013/0015311 A1 * | 1/2013 | Kim | | H05K 5/0234 248/393 |
| 2013/0128443 A1 * | 5/2013 | Tseng | | G06F 1/1616 361/679.12 |
| 2013/0229773 A1 * | 9/2013 | Siddiqui | | G06F 1/1618 361/679.59 |
| 2014/0174960 A1 * | 6/2014 | Zhu | | H04M 1/04 206/45.24 |
| 2014/0293534 A1 * | 10/2014 | Siddiqui | | E05D 7/00 361/679.55 |
| 2015/0212553 A1 * | 7/2015 | Park | | G06F 1/1615 361/679.27 |
| 2015/0342067 A1 * | 11/2015 | Gault | | H05K 5/0226 248/357 |
| 2016/0083989 A1 * | 3/2016 | Kuo | | E05D 1/04 16/355 |
| 2016/0090767 A1 * | 3/2016 | Park | | E05D 11/10 16/319 |
| 2017/0068284 A1 * | 3/2017 | Park | | E05D 11/10 |
| 2017/0208703 A1 * | 7/2017 | Lin | | E05F 1/1016 |
| 2018/0129253 A1 * | 5/2018 | Siddiqui | | E05D 1/04 |

\* cited by examiner

HINGE STRUCTURE

CROSS-REFERENCE TO RELATED APPLICATION

This application claims the priority benefit of Taiwan application serial no. 106116528, filed on May 18, 2017. The entirety of the above-mentioned patent application is hereby incorporated by reference herein and made a part of this specification.

BACKGROUND

1. Technical Field

The disclosure relates to a hinge structure.

2. Description of Related Art

In recent years, with the advancement in the industry of science and technology, electronic devices, such as notebook (NB) computers, tablet computers, and smart phones, are used more and more frequently in our daily life. As the types, uses, and functions of the electronic devices diversify to a greater extent, the convenience and usefulness make the electronic devices more and more popular. Besides, the electronic devices may be used differently based on the user's needs. For some tablet-like electronic devices, such as tablet computers, the angle of use of the device body of such electronic devices is not adjustable. Therefore, such electronic devices may be used with a support frame to adjust the angle of use. For example, with the support frame, the electronic devices may be arranged to stand on a desk.

As an example, a common support fame is formed by a protective cover disposed on an electronic device. In addition, the protective cover substantially includes two plates and a hinge structure, and the plates are rotatable with respect to each other via the hinge structure. Thus, when the protective cover is disposed on a back surface of the electronic device, the two plates form a planar surface, and the use of the electronic device is not affected. For example, the touch of the user holding the electronic device or the placement of the electronic device on the desk is not affected. When the user intends to arrange the electronic device to stand on the desk, a lower plate of the protective cover may be moved outward to serve as the support frame. In other words, the lower plate of the protective cover may be moved outward to serve as a support fame, and the electronic device is supported with a bottom part of the electronic device and the support frame and in a tilted state.

However, when the user operates the electronic device, such as pressing the display of the electronic device with his/her finger, an external force exerted by the user is transmitted to the hinge structure on the protective cover, and the lower plate serving as the support frame may move away from the bottom part of the electronic device and be bent toward an upper plate. Under the circumstance, the hinge structure may be damaged easily. In other words, the hinge structure may be damaged through operation of the electronic device. Besides, when the lower plate as the support frame is no longer needed, the user needs to additionally move the lower plate back to the back surface of the electronic device. Hence, the complexity of operating the support frame is increased.

Besides, while the conventional continuous hinge allows the support frame to be stopped at any arbitrary expanded position, the continuous hinge needs to use a friction force generated through tight arrangement of hinge components. However, such arrangement may easily wear out the components as the count of use increases. Accordingly, the friction force may decrease. Meanwhile, to ensure that the friction force generated between the components reaches a predetermined value, the precision of the components as well as the precision of assembling of the components need to meet a certain standard. Thus, the yield rate of the manufacturing process may be decreased, and the cost may be increased.

SUMMARY

The disclosure provides a hinge structure having a desirable applicability and durability.

A hinge structure according to an embodiment of the invention is adapted to connect two objects for the two objects to rotate with respect to each other. The hinge structure includes a first member, a second member, a third member, and an elastic assembly. The first and the third members are respectively assembled to the two objects. The second member is pivoted to the first member and rotates about an axis relative to the first member. The third member is pivoted to the second member and rotates about the axis relative to the second member. In a first state, the second member is accommodated in a recess of the first member. In a second state, the second member moves along with the third member and at least a portion of the second member is moved out of the recess. The elastic assembly is connected between the first and the third members constantly drives the third member to move the second member into the recess to maintain the first state.

Based on the above, the hinge structure is respectively assembled to two objects via the first member and the third member. The second member is pivoted to the first member and the third member is pivoted to the second member. In addition, pivotal axes between the members are co-axial, so the two objects are rotatable with respect to each other with a fan-shaped pivotal movement resulting from pivotally opening or closing of the members. Moreover, the elastic assembly constantly drives the third member to pivotally rotate the second member and close up. Accordingly, the objects may be automatically restored to the original position after being expanded. Accordingly, the components may achieve a desired pivotal movement with a relatively loose arrangement. Consequently, the manufacturing cost is reduced effectively, and the durability of the components is also increased.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
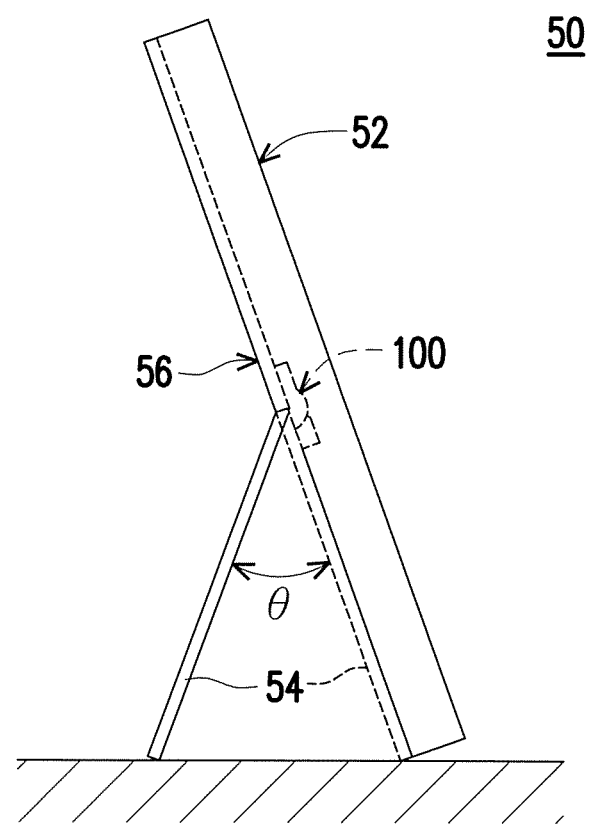
FIG. 1 is a schematic view illustrating an electronic device according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

Figure 2:
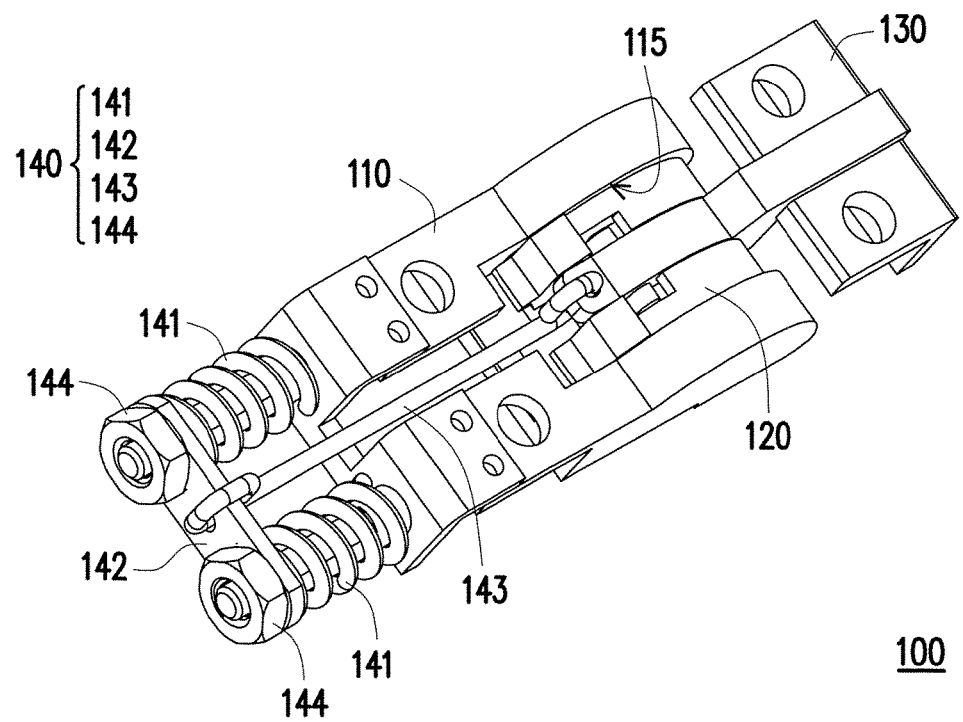
FIG. 2 is a schematic view illustrating a hinge structure in the electronic device.
Figure 3:
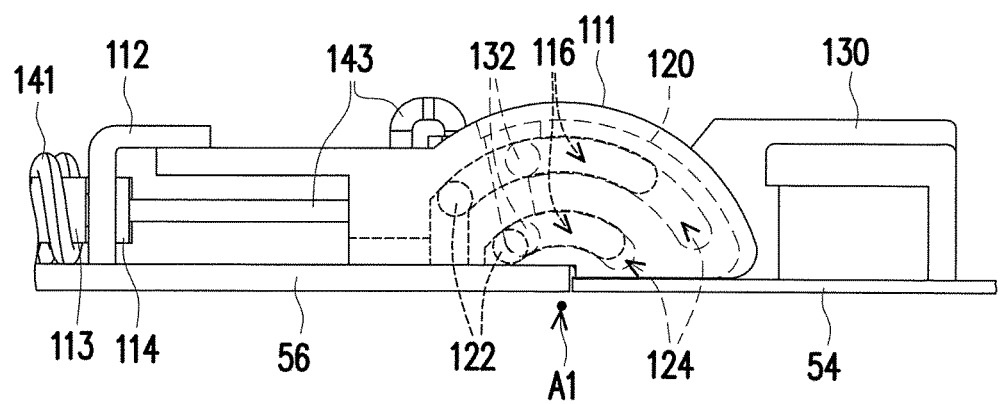
FIG. 3 is a side view illustrating the hinge structure of FIG. 2.

FIG. 1 is a schematic view illustrating an electronic device according to an embodiment of the invention. FIG. 2 is a schematic view illustrating a hinge structure in the electronic device. FIG. 3 is a side view illustrating the hinge structure of FIG. 2. Referring to FIGS. 1 to 3, in the embodiment, an electronic device 50 is a tablet computer, for example, and includes a device body, a support frame 54, and a hinge structure 100. The device body includes a display 52 and a back plate 56 opposite to each other. The hinge structure 100 and the support frame 54 are disposed at the back plate 56. As shown in FIG. 1, by rotating the hinge structure 100, the support frame 54 is expanded at an angle θ with respect to the back plate 56. As shown in FIG. 1, in the electronic device 50, the device body is supported by the support frame 54. In addition, as the angle θ differs, there are also different states of use. Accordingly, the applicability of the electronic device 50 is increased. A range of the angle θ is not limited herein. In another state not shown herein, the support frame 54 may be expanded up to 180 degrees relative to the back plate 56. In other words, the support frame 54 may be expanded to be stacked onto the back plate 56.

Figure 4:
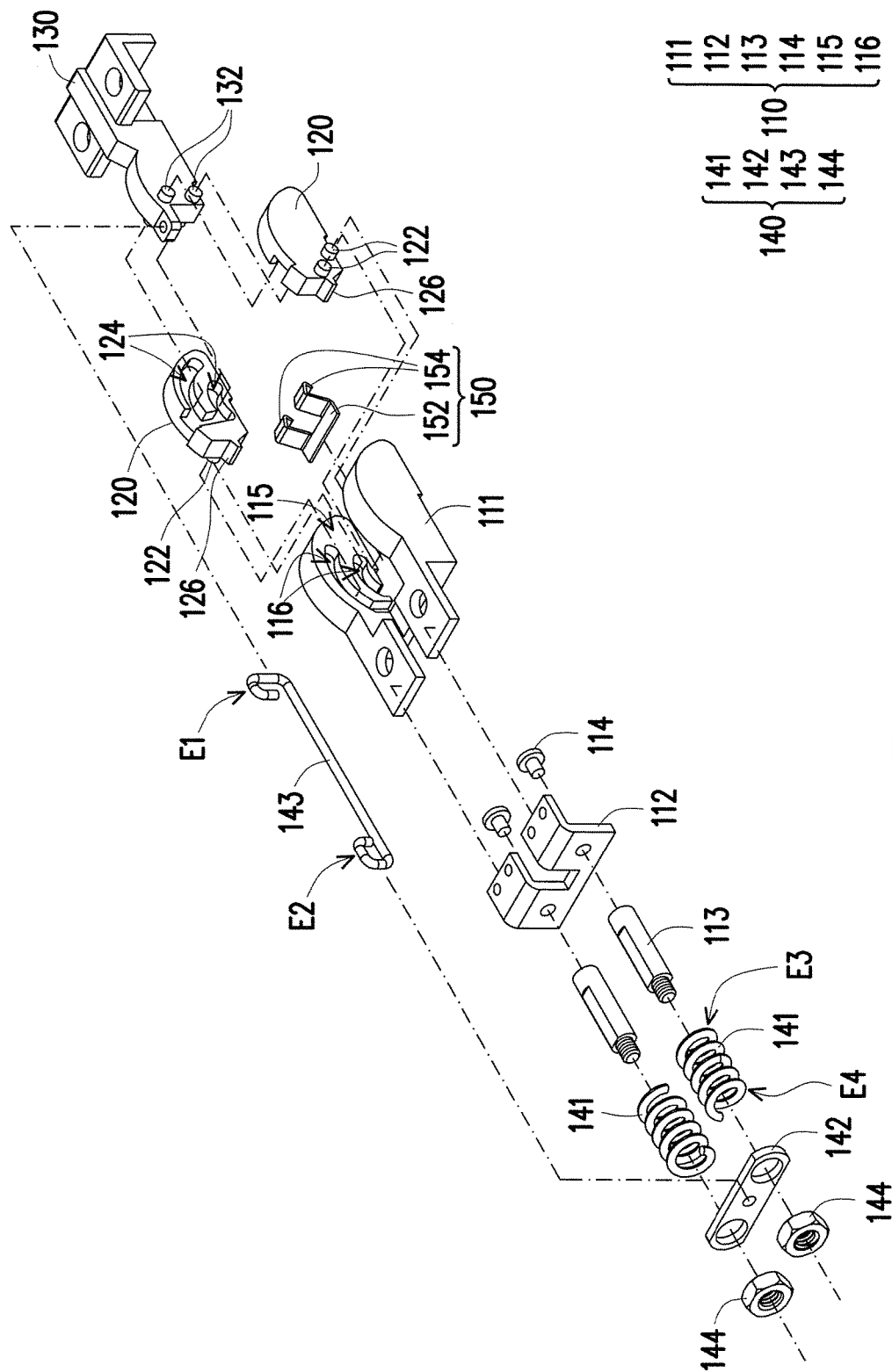
FIG. 4 is an exploded view illustrating the hinge structure of FIG. 2.

FIG. 4 is an exploded view illustrating the hinge structure of FIG. 2. Referring to FIGS. 2 to 4, the hinge structure 100 includes a first member 110, a second member 120, a third member 130, and an elastic assembly 140. It should be noted that the back plate 56 and the support frame 54 of FIG. 1 are shown in FIG. 3 for the convenience of describing movement of the hinge structure subsequently.

In the embodiment, the first member 110 is assembled to the back plate 56 of the device body, the third member 130 is assembled to the support frame 54. Also, the second member 120 is pivoted to the first member 110, and the third member 130 is pivoted to the second member 120. In addition, the second member 120 is rotatable about an axis A1 relative to the first member 110, and the third member 130 is rotatable about the axis A1 relative to the second member 120.

Figure 5:
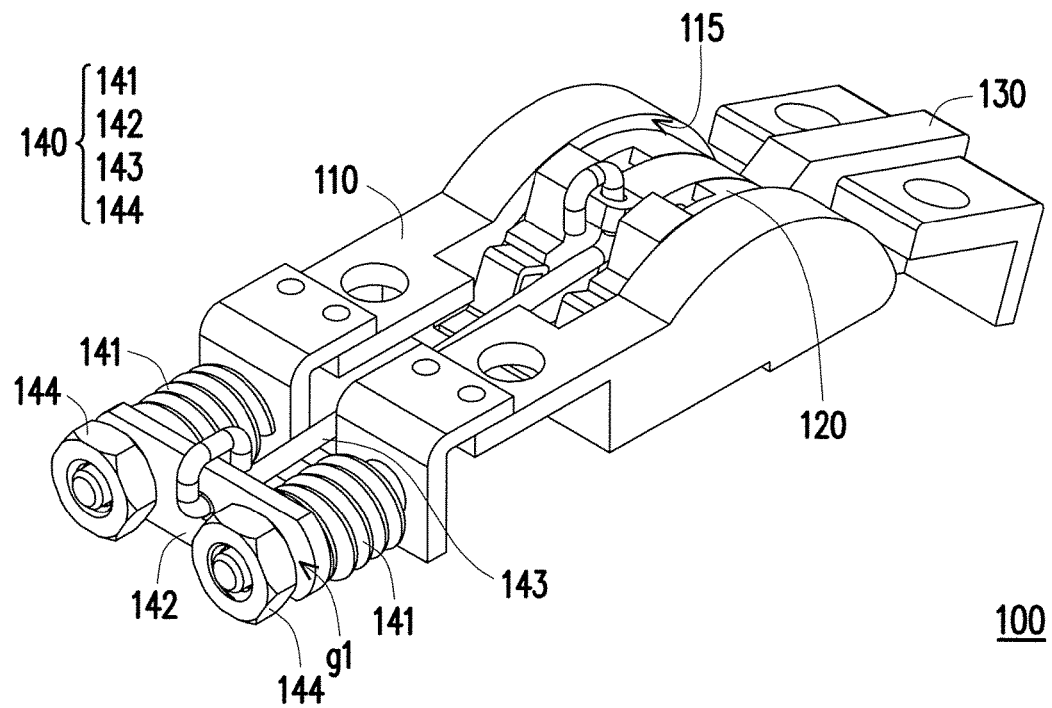
FIG. 5 is a schematic view illustrating the hinge structure of FIG. 2 in another state.
Figure 6:
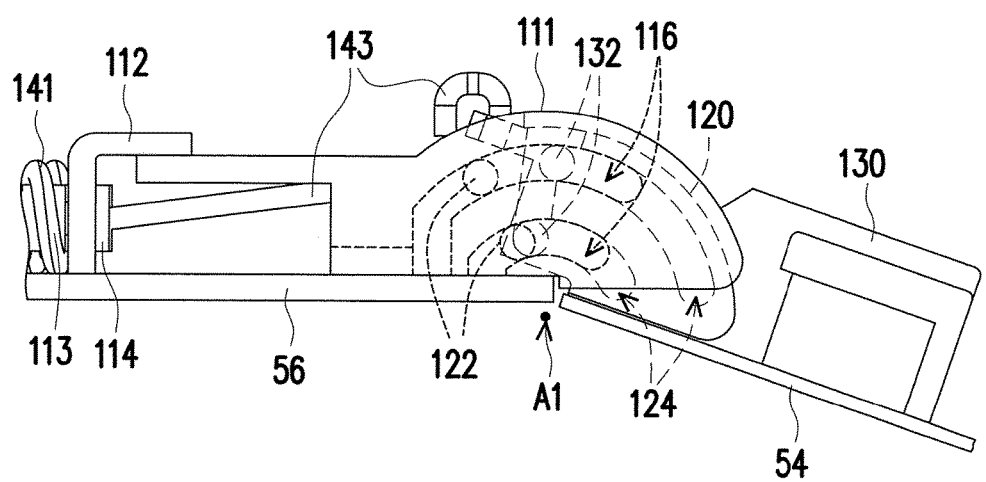
FIG. 6 is a side view illustrating the hinge structure of FIG. 5.

FIG. 5 is a schematic view illustrating the hinge structure of FIG. 2 in another state. FIG. 6 is a side view illustrating the hinge structure of FIG. 5. Referring to FIGS. 2 to 6, FIGS. 2 and 3 illustrate a first state of the hinge structure 100, i.e., a state when the hinge structure 100 is not rotated. In the state, the back plate 56 and the support frame 54 are on the same plane, as shown in FIG. 1 (i.e., the back plate 56 and the support frame 54 whose profile is drawn with a dash line). In other words, the support frame 54 is yet to expand relative to the device body. Comparatively, FIGS. 5 and 6 illustrate a second state of the hinge structure 100, i.e., a state when the hinge structure 100 is rotated. In the state, the back plate 56 and the support frame 54 are bent relative to each other, as shown in FIG. 1 (i.e., the back plate 56 and the support frame 54 whose profile is drawn with a solid line). In other words, the support frame 54 is expanded at an angle θ relative to the device body. It should be noted that the range of the angle θ is not limited herein. In other words, in the embodiment, it is deemed as the second state as long as the support frame 54 is expanded (not closed) relative to the device body.

Referring to FIG. 3 again, specifically, the first member 110 includes a primary part 111, a secondary part 112, an extension part 113, and a fixing part 114. In addition, the primary part 111 has a recess 115 and a first rail 116 disposed at the recess 115. In addition, the first rail 116 is an arc-shaped structure whose center is the axis A1 (as shown in FIGS. 3 and 6). The second member 120 is arranged as a couples structure and has a first guiding column 122 located at an outer part (outer side surface) and a second rail 124 located at an inner part (inner side surface). The second rail 124 is an arc-shaped structure whose center is the axis A1. The first guiding column 122 is movably inserted to the first rail 116 to move along the first rail 116. A portion of the third member 130 includes a second guiding column 132. The second guiding column 132 is movably inserted to the second rail 124 to move along the second rail 124. In addition, the portion is arranged to be located between the couples structure of the second member 120.

Referring to FIGS. 2 and 3, in the first state, the first member 110, the second member 120, and the third member 130 are stacked with respect to each other after being combined. In addition, the first rail 116 and the second rail 124 are partially overlapped with each other. As shown in FIG. 3, the axis A1 of the first rail 116 and the second rail 124 adopt the axis A1 as the center to be surrounded. Therefore, when the support frame 54 receives a force and is expanded relative to the back plate 56, the third member 130 also drives the second member 120 through movement of the second guiding column 132 on the second rail 124. Accordingly, the first guiding column 122 of the second member 120 is moved on the first rail 116 to gradually move the second member 120 away from the recess 115 of the first member 110. In other words, the state is converted into a state shown in FIGS. 5 and 6. As the angle θ of expansion increases, the portion of the second member 120 moving away from the recess 115 also increases.

Based on the above and the illustration of FIGS. 3 to 6, in the hinge structure 100 of the embodiment, a fan-shaped pivotal movement resulting from pivotally opening or pivotally closing of the components is achieved by arrangement of coaxial components (i.e., the first rail 116 and the second rail 124 corresponding to the same axis A1). Accordingly, the support frame 54 is smoothly driven to rotate and open or close relative to the back plate 56.

Referring to FIG. 4, it should be noted that the elastic assembly 140 of the hinge structure 100 includes a connection member 143 and an elastic member 141. In addition, the connection member 143 has a first end E1 and a second end E2. The first end E1 is fixedly connected to the third member 130. The elastic member 141 has a third end E3 and a fourth end E4. The third end E3 abuts against the secondary part 112 of the first member 110. Based on whether the elastic member 141 is deformed or not, the second end E2 synchronously moves with the fourth end E4. Moreover, the third end E3 is located between the first and second ends E1 and E2 and the fourth end E4. Accordingly, when the third member 130 moves away from a location in the first state (i.e., when the support frame 54 is expanded), the first end E1 is away from the third end E3, and the second end E2 and the fourth end E4 are synchronously moved toward the third end E3 to deform the elastic member 141.

More specifically, as shown in FIG. 4, the secondary part 112 of the first member 110 is combined to an extension plate of the primary part 111, whereas the extension part 113 (shown as two extension columns here) is combined to the secondary part 112 through the fixing part 114. Then, the elastic member 141 is disposed through the extension part 113 (two elastic members 141 are shown to correspond to two extension parts 113). Meanwhile, the elastic assembly 140 further includes an abutting member 142 disposed through the extension part 113 to abut the elastic member 141 between the abutting member 142 and the secondary part 112 of the first member 110. In addition, the third end E3 of the elastic member 141 abuts against the secondary part 112, and the fourth end E4 abuts against the abutting member 142. Here, the abutting member 142 has two openings to correspond to two extension parts 113. In addition, an inner diameter of the opening is greater than an outer diameter of the extension part 113. Thus, based on whether the elastic member 141 is deformed or not, the abutting member 142 may move along the extension part 113.

Referring to FIGS. 5 and 6 as well as FIG. 4, when the support frame 54 is rotated relative to the back plate 56, the third member 130 may drive the second member 120 to gradually move out of the recess 115 of the first member 110. However, since the connection member 143 is connected between the third member 130 and the abutting member 142 of the elastic assembly 140, the first end E1 may follow the third member 130 to allow the second end E2 to move the abutting member 142 toward the secondary part 112, thereby deforming (compressing) the elastic member 141. It should be noted that the connection member 143 is considered as a rigid structure, so the connection member 143 itself does not deform, or the deformation of the connection member 143 may be ignored. In other words, in the first state, the third end E3 is located between the first and second ends E1 and E2 and the fourth end E4. In addition, since the fourth end E4 of the elastic member 141 abuts against the abutting member 142, the fourth end E4 may be considered as being synchronous with the second end E2 of the connection member 143. Therefore, when the third member 130 moves away from the location in the first state, the first end E1 of the connection member 143 may move away from the third end E3 of the elastic member 141. Hence, the second end E2 and the fourth end E4 may synchronously move toward the third end E3 to deform the elastic member 141. In brief, with the connection member 143, when the third member 130 of the hinge structure 100 is not in the first state, the elastic member 141 is in a state of being deformed.

As described above, the support frame 54 receives a force and expands relative to the back plate 56. For example, when intending to reach the state shown in FIG. 1, the user may exert a force to the support frame 54 to expand the support frame 54 at the angle θ (the elastic member 141 is consequently deformed) and arrange the support frame 43 to stand on a platform. Under the circumstance, the weight of the electronic device 50 itself is greater than and sufficient to resist against an elastic restoring force of the elastic member 141, so the electronic device 50 is able to smoothly reach the state shown in FIG. 1. When intending to restore the support frame 54 and closing up the support frame 54 to the device body, the user only needs to take the electronic device 50 from the platform. In this way, the abutting member 142, the connection member 143, the third member 130, and the second member 120 are able to be restored to the original position (i.e., restored to the first stage shown in FIGS. 2 and 3) by means of the elastic restoring force of the elastic member 141.

Referring to FIGS. 2, 4, and 5, in the embodiment, the elastic assembly 140 may further include an adjustment member, such as a nut cap. The adjustment member 144 may be adjustably disposed through the extension part 113 (i.e., adjustably locked to the extension part 113 through a screw thread on the extension part 113). The adjustment member 144 is able to adjust a position of the abutting member 142 on the extension part 113 accordingly. In other words, the abutting member 142 is structurally in contact between the adjustment member 144 and the elastic member 141 to adjust a degree of deformation of the elastic member 141 and correspondingly adjust a torque of the hinge structure 100. In other words, when the device body of the electronic device 50 is lighter, the elastic member 141 in the first state may be slightly deformed or not deformed to avoid an excessive elastic restoring force that makes the electronic device 50 unable to maintain the expanded angle θ of the support frame 54 with its own weight. Meanwhile, when the abutting member 142 is driven by the connection member 143 to compress the elastic member 141, a gap g1 is provided between the abutting member 142 and the adjustment member 144.

Figure 7:
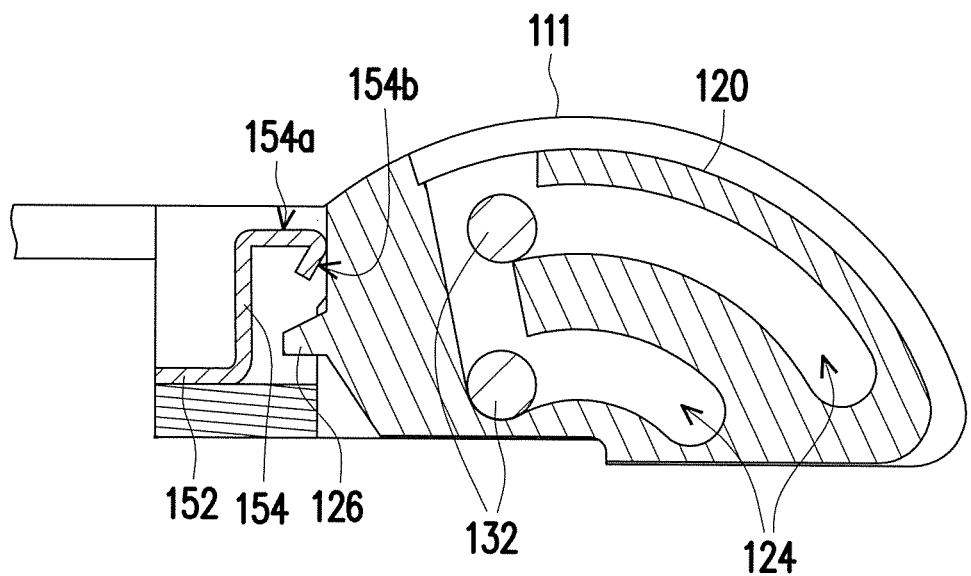
FIGS. 7 and 8 are respectively partial cross-sectional views illustrating the hinge structure of FIG. 2.
Figure 8:
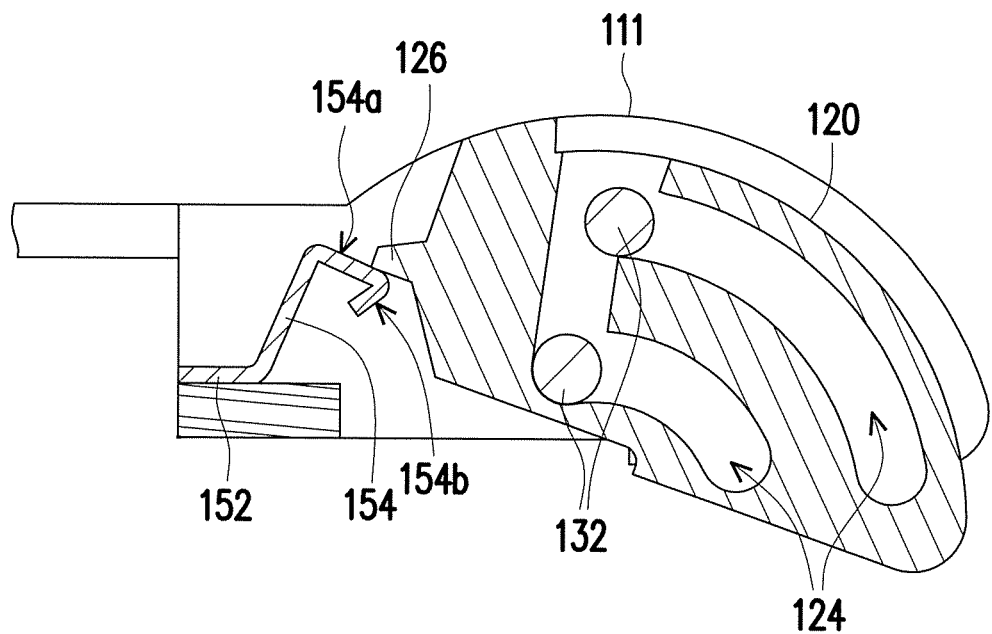

FIGS. 7 and 8 are respectively partial cross-sectional views illustrating the hinge structure of FIG. 2 and respectively correspond to the first state shown in FIG. 2 and a second state shown in FIG. 6. Referring to FIGS. 3, 7, and 8, in the embodiment, the hinge structure 100 further includes a stopping member 150, such as a leaf spring. The stopping member 150 includes a base 152 and a free end 154. In addition, the base 152 is assembled to the recess 115 of the first member 110, and the free end 154 may extend toward the second member 120 and the third member 130. Correspondingly, the second member 120 further includes a protruding part 126 disposed away from the third member 130. In addition, the free end 154 is located on a movement path of the protruding part 126. Therefore, when the second member 120 is converted from the second state to the first state, the stopping member 150 may prevent the second member 120 from being restored to the location in the first state.

Specifically, the free end 154 of the stopping member 150 is in a bent shape. As shown in FIGS. 7 and 8, the bent shape includes a top part 154a and a bottom part 154b. In the first state, the bottom part 154b (the part close to the bent shape) of the stopping member 150 substantially abuts against the second member 120. Comparatively, when the second member 120 is converted from the second state to the first state, since the protruding part 126 may firstly abut against the top part 154a, the second member 120 may be maintained at a damping position (i.e., the position shown in FIG. 8). Under the circumstance, due to an elastic characteristic of the stopping member 150, the stopping member 150 may temporarily keep the second member 120 in the second state and provide a damping effect. Hence, the user is free of the concern that his/her hand may be clamped when the support frame 54 is restored to the original position. Then, the user only needs to further exert a force on the support frame 54. Thus, the third member 130 receives a force and converts the second member 120 to the first state. In other words, after an elastic force of the stopping member 150 is overcome, the protruding part 126 may pass through the bent shape of the free end 154, and the bottom part 154b of the bent shape thus again contacts the second member 120. Consequently, the hinge structure 100 and the support frame 54 are restored to the original position (i.e., to the first state). A position of the free end 154 may be adjusted to change the damping position.

In view of the foregoing, in the embodiments of the invention, the hinge structure is respectively assembled to two objects via the first member and the third member. The second member is pivoted to the first member and the third member is pivoted to the second member. In addition, pivotal axes between the members are co-axial, so the two objects are rotatable with respect to each other with a fan-shaped pivotal movement resulting from pivotally opening or closing of the members. Moreover, the elastic assembly constantly drives the third member to pivotally rotate the second member and close up. Accordingly, the objects may be automatically restored to the original position after being expanded. To be more specific, with the connection member of the elastic assembly connected between the third member and the elastic member, the elastic member may be driven by the connection member and deformed through movement of the third member. Thus, when the external force expanding the support frame is removed, the support frame may be restored to the original position through the elastic restoring force.

In other words, since the respective components of the hinge structure are not driven by a friction force, it is no longer necessary to tightly arrange the components, and potential wearing of the components is thus significantly reduced. Meanwhile, the requirement on the precision of the sizes of the components is loosened. Thus, the manufacturing cost is effectively reduced, and the durability of the components is also increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A hinge structure, adapted to connect two objects for the two objects to rotate relatively via the hinge structure, the hinge structure comprising:
    a first member, assembled to one of the two objects;
    a second member, pivoted to the first member, wherein the second member rotates about an axis relative to the first member;
    a third member, assembled to the other of the two objects, wherein the third member is pivoted to the second member, the third member rotates about the axis relative to the second member, and in a first state, the second member is accommodated in a recess of the first member, whereas in a second state, the second member rotates about the axis with the third member, and at least a portion of the second member is moved out of the recess; and
    an elastic assembly, connected between the first member and the third member and constantly driving the third member to move the second member into the recess to maintain the first state, wherein the elastic assembly comprises:
        a connection member, having a first end and a second end, wherein the first end is fixedly connected to the third member; and
        an elastic member, having a third end and a fourth end, wherein the third end abuts against the first member, the second end synchronously moves with the fourth end based on whether the elastic member is deformed or not, and the third end is located between the first end and the second and fourth ends, such that the first end moves away from the third end when the third member moves away from a location in the first state to synchronously move the second end and the fourth end toward the third end, thereby deforming the elastic member.

2. The hinge structure as claimed in claim 1, wherein the elastic assembly comprises:
    the elastic member, disposed through an extension part of the first member;
    an abutting member, disposed through the extension part, such that the elastic member abuts between the first member and the abutting member; and
    the connection member, connected between the third member and the abutting member, such that the third member drives the abutting member through the connection member when it is not in the first state, thereby defoii ling the elastic member.

3. The hinge structure as claimed in claim 2, wherein the elastic assembly further comprises:
    an adjustment member, adjustably disposed through the extension part, such that the abutting member is structurally in contact between the adjustment member and the elastic member, wherein the adjustment member adjusts a position along the extension part to adjust a position of the abutting member on the extension part and a degree of deformation of the elastic member.

4. The hinge structure as claimed in claim 1, wherein the first member has a first rail, the second member has a first guiding column movably inserted to the first rail to move along the first rail, and the first rail is an arc-shaped structure whose center is the axis.

5. The hinge structure as claimed in claim 4, wherein the second member has a second rail, the third member has a second guiding column movably inserted to the second rail to move along the second rail, and the second rail is an arc-shaped structure whose center is the axis.

6. The hinge structure as claimed in claim 5, wherein the second member is a couples structure, the first guiding column is disposed on an outer side surface of the couples structure, the second rail is disposed on an inner side surface of the couples structure, and a portion of the third member includes the second guiding column to be inserted to the second rail, such that the portion is located between the couples structure.

7. The hinge structure as claimed in claim 1, wherein the first member has a first rail, the second member has a first guiding column movably inserted to the first rail to move along the first rail, the second member has a second rail, the third member has a second guiding column movably inserted to the second rail to move along the second rail, and the first rail and the second rail are partially overlapped with each other.

8. The hinge structure as claimed in claim 1, further comprising:
    a stopping member, disposed on the first member and located in a movement path of the second member, wherein when the second member is converted from the second state to the first state, the stopping member blocks the second member from being restored to the first state.

9. The hinge structure as claimed in claim 8, wherein the second member comprises a protruding part disposed on a side of the second member away from the third member, the stopping member is an elastic structure having a free end extending toward the second member and located on a movement path of the protruding part, such that during conversion of the second member from the second state to the first state, the protruding part abuts against the free end to maintain the second member at a damping position.

10. The hinge structure as claimed in claim 9, wherein the free end is in a bent shape, the protruding part abuts against a top part of the bent shape when the second member is located at the damping position, and when the third member receives a force to convert the second member to the first state, the protruding part passes through the bent shape such that a bottom part of the bent shape abuts against the second member.

11. The hinge structure as claimed in claim 1, wherein the two objects respectively are a device body and a support frame of a portable electronic device, the first member is assembled to the device body, and the third member is assembled to the support frame.

\* \* \* \* \*